(12) United States Patent
Fraenkel

(10) Patent No.: US 6,311,500 B1
(45) Date of Patent: Nov. 6, 2001

(54) METHOD AND APPARATUS FOR PREPARING ICE CUBES

(76) Inventor: Ian Fraenkel, 1015 E. Broad St., Westfield, NJ (US) 07090

( * ) Notice: Subject to any disclaimer, the term of this patent is extended or adjusted under 35 U.S.C. 154(b) by 0 days.

(21) Appl. No.: 09/663,257

(22) Filed: Sep. 15, 2000

Related U.S. Application Data

(60) Provisional application No. 60/154,031, filed on Sep. 16, 1999.

(51) Int. Cl.[7] ........................................ F25C 1/00
(52) U.S. Cl. ............................... 62/66; 99/517
(58) Field of Search ..................... 62/1, 66; 99/516, 99/517

(56) References Cited

U.S. PATENT DOCUMENTS

| | | | |
|---|---|---|---|
| 2,162,162 | * | 6/1939 | De Murguiondo ................. 249/61 |
| 2,955,044 | | 10/1960 | Tupper ................................ 99/171 |
| 2,964,920 | | 12/1960 | Staebler ............................... 62/60 |
| 3,783,089 | | 1/1974 | Hurst et al. ....................... 161/166 |
| 4,813,646 | * | 3/1989 | Fujio .................................. 249/55 |
| 4,899,976 | | 2/1990 | Cederroth et al. ................ 249/61 |
| 5,393,032 | | 2/1995 | Cederroth ......................... 249/61 |

* cited by examiner

Primary Examiner—William Doerrler
Assistant Examiner—Mohammad M. Ali
(74) Attorney, Agent, or Firm—Walter J. Tencza, Jr.

(57) ABSTRACT

A method is disclosed comprising the steps of placing a first portion of a mixture of spring water and distilled water into a first chamber; and freezing the first portion of the mixture inside the first chamber to form a first ice cube. The mixture may comprise about ninety percent distilled water and ten percent pure spring water. The method may include placing a second portion of the mixture into a second chamber and freezing the second portion of the mixture inside the second chamber to form a second ice cube. The first and second chambers may be attached together by a backing. The method may also include sealing the first chamber after placing the first portion of the mixture into the first chamber and before freezing the first portion. The first chamber may be sealed by placing a foil over the first chamber. The method may include removing bacteria from the first portion after placing the first portion into the first chamber and before freezing the first portion. An apparatus is also disclosed which may include a backing, a plurality of chambers connected to the backing, and a plurality of portions of frozen water, one portion inside each of the plurality of chambers. Each of the plurality of chambers are held to each other by perforations so that each chamber can be detached from the other chambers. The frozen water may be comprised of a mixture of spring water and distilled water.

16 Claims, 3 Drawing Sheets

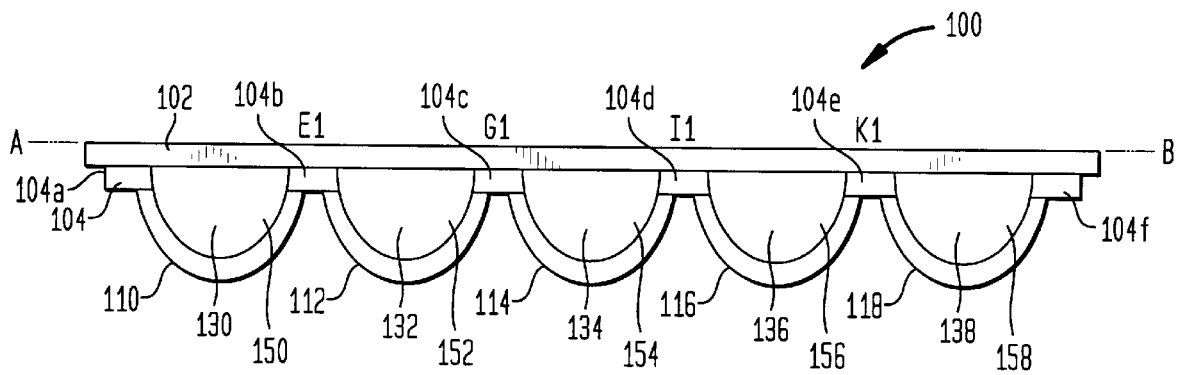
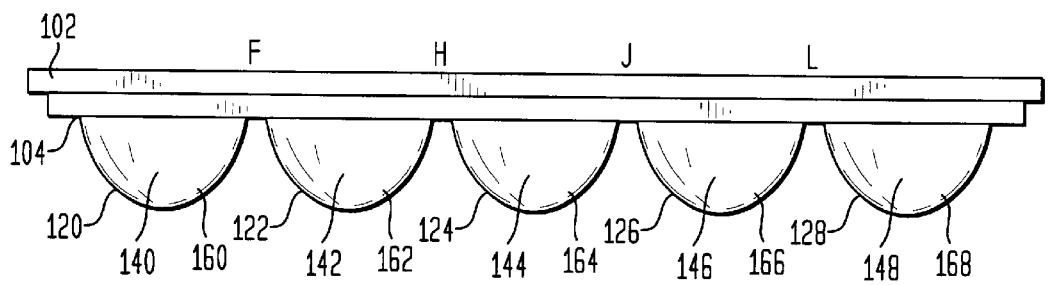
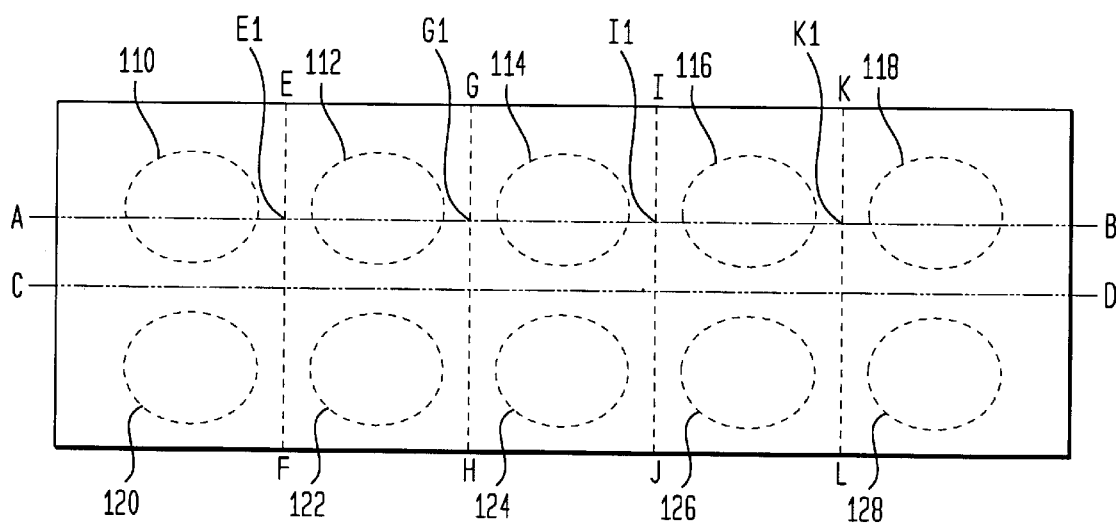

METHOD AND APPARATUS FOR PREPARING ICE CUBES

CLAIM FOR PRIORITY OF PROVISIONAL

The present application claims the priority of provisional application Ser. No. 60,154,031, title "PACKAGING FOR ICE CUBES" filing date Sep. 16, 1999 inventor Ian Fraenkel.

FIELD OF INVENTION

The present invention relates to packaging for liquids, and more particularly for packaging for water-base liquids.

BACKGROUND OF THE INVENTION

Ice cubes are widely used throughout the world to chill drinks, such as water, juices, mixed drinks and alcoholic drinks. Typically, ice cubes are made by taking a tray having a plurality of trough-like compartments and filling the same with tap water from the sink. The tray is then placed into a freezer until the water freezes forming the ice cubes which can then be removed from the plurality of troughs as needed. Over the last decade, public awareness has increased about the significant health risks from contaminants such as lead and PCBs that are associated with drinking tap water. As a result, consumers are spending increasing amounts of money to purchase water bottled from natural springs and other sources free of contaminants instead of drinking tap water. The sale of bottled water is presently a billion dollar market.

Although consumers are spending significant sums to purchase bottled water, they still typically use ice cubes made form tap water to chill their drinks. Thereby defeating the purpose of purchasing and consuming healthier bottled water.

U.S. Pat. No. 4,899,976 to Cederroth Et. al., incorporated by reference herein discloses freezing "pure" spring water to form ice cubes.

SUMMARY OF THE INVENTION

The present invention in one embodiment provides packaging for ice cubes comprised of a plurality of non-rigid, bag like compartments which are coupled together along detachable perforated edges and which are filled with spring water, mineral water, or the like. The packaging and the water therein can be sold off the shelf in stores in liquid form at room temperature. When placed in a freezer, the water freezes and an ice cube can be removed from each compartment. Each compartment includes a clear or opaque front surface through which the liquid water of frozen ice cube can be viewed, and a foil back surface. When the water freezes, an ice cube can be individually removed from a compartment by pushing on its front surface thereby forcing the ice cube through the foil back surface. In a second embodiment, the packaging is comprised of a plurality of rigid, trough-like compartments that are coupled together along detachable perforated edges and are filled with spring water, mineral water or the like. Each compartment includes a top surface that can be removed so that the ice cube therein can be removed therefrom for use.

In another embodiment a method is provided which includes providing a mixture of distilled water and pure spring water. The mixture may be ninety percent distilled water and ten percent pure spring water. Pure spring water by itself does not freeze well. Frozen pure spring water has a charred, cloudy, jagged, and rough appearance. The mixture of distilled water and pure spring water, particularly in the combination ninety percent and ten percent, allows ice cubes to be formed which are smooth and clear. In addition after pouring a combination of spring water an distilled water into a chamber, and prior to freezing, it is beneficial to remove bacteria by for example first a nitrogen flush, and then ozination or gamma radiation. Without bacteria removal, bacteria may form on the top of the ice cubes or inside the ice cubes.

BRIEF DESCRIPTION OF THE DRAWINGS

FIG. 5 shows a cross sectional view of an apparatus of an embodiment of the present invention with water and with foil;

FIG. 6 shows a side view of an apparatus of an embodiment of the present invention with water and with foil; and FIG. 7 shows a top view of an apparatus of an embodiment of the present invention with water and with foil.

DETAILED DESCRIPTION OF THE INVENTION

Figure 1:
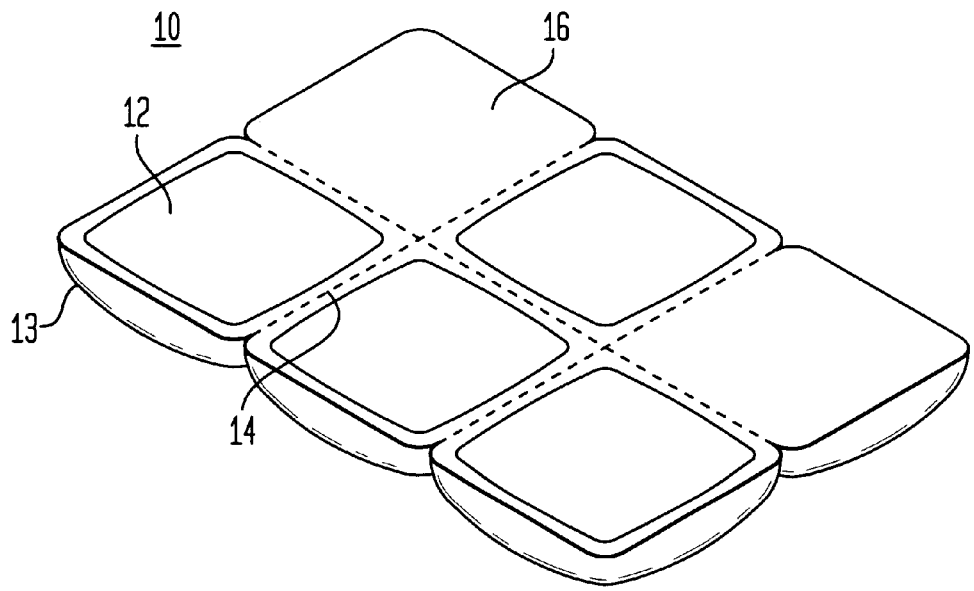
FIG. 1 shows a side view of a first exemplary embodiment of the packaging for ice cubes according to an embodiment of the present invention.

FIG. 1 shows a perspective view of a first exemplary embodiment of a packaging 10 for ice cubes according to the present invention. Packaging 10 is comprised of a plurality of non-rigid, bag like compartments 12 which are coupled together along detachable perforated edges 14. Alternatively, compartments 12 can be rigid. Each compartment is filled with spring water, mineral water or the like (and in some embodiments a mixture of spring water and distilled water), and includes a front surface 16 and a back surface 18 which are adhered together to form a secure, tamper-resistant, leak-proof compartment 12. The compartments 12 may not be filled to the top, but rather about six percent of the compartments 12 may be left empty to allow the water in the compartment 12 to expand during freezing. Leaving six percent space to allow for water expansion may be done in any of the embodiments in the present application. Each compartment 12 takes the shape of its contents. Each compartment 12 individually detaches from the other compartments 12 by tearing the compartment 12 to be removed along perforated edges 14. Front surface 16 can be made from plastic or any another suitable material, and back surface 18 can be made from foil or any other suitable material.

Packaging 10 is designed to be sold off the shelf in stores at room temperature, wherein the water in each compartment 12 is in liquid form. Package 10 can then be placed into a freezer and the water in compartments 12 frozen. Once the water freezes, an ice cube can be removed from a single compartment 12 by pushing on front surface 16 to force the ice cube to break foil back surface 18 and thus be available for use. Packaging 10 can be fabricated using an additional layer or additional layers of material positioned between and/or adjacent to front surface 16 and back surface 18.

Figure 2:
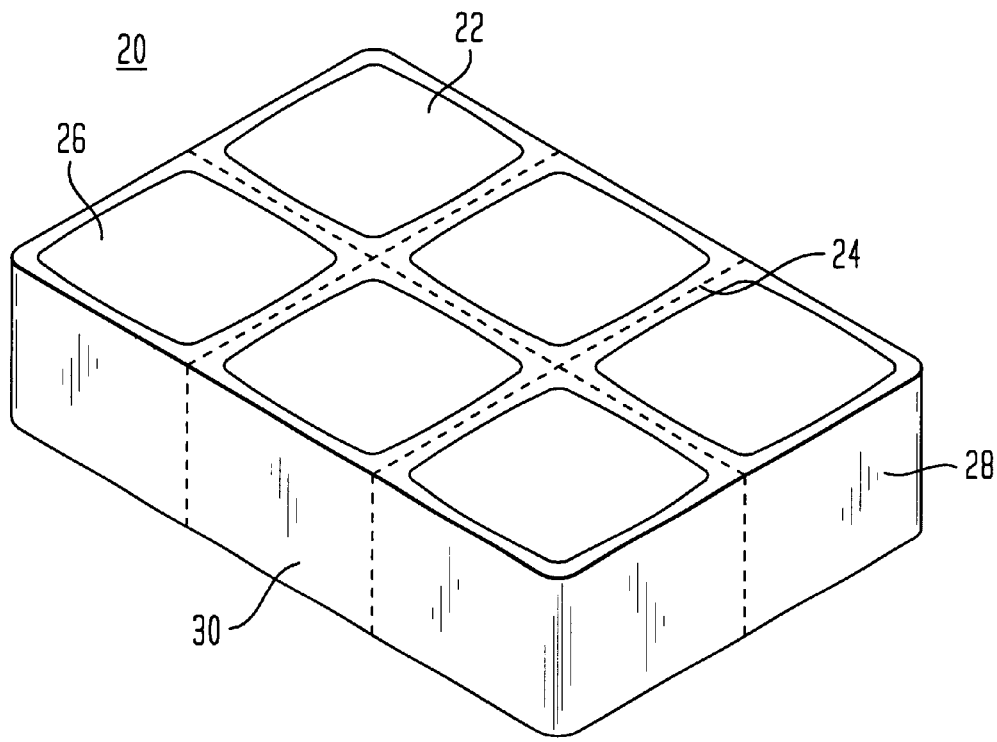
FIG. 2 shows a side view of a second exemplary embodiment of the packaging for ice cubes according to an embodiment of the present invention.

FIG. 2 shows a perspective view of a second exemplary embodiment of a packaging 20 for ice cubes according to the present invention. Packaging 20 is comprised of a plurality of rigid trough-like compartments 22 which are coupled together along detachable perforated edges 24. Each compartment 22 includes a removable top surface 26, rigid side surfaces 28 and a rigid bottom surface 30. Packaging 20 is sold and used in the same manner as packaging 10. Once the water in packaging 20 freezes, individual ice cubes can be removed for use by detaching a single compartment 22 from the other compartments 22 along perforated edges 24 and then removing top surface 26 from the single compartment 22 to access the ice cube. Packaging 20 can also be fabricated using surfaces in addition to surfaces 26, 28 and 30.

Packaging 10 and 20 can be fabricated in any shape, any dimension, i.e., width, depth, etc., and from any materials. The materials chosen for packaging will ideally be light weight and will not contaminate the water contained therein.

Packaging 10 and 20 will enable consumers to use healthy ice cubes mad from spring or mineral water of their choice to chill their drinks. Liquids other than water can also be packaged in packaging 10 and packaging 20.

An apparatus 100 and a method in accordance with another embodiment of the present invention is shown and will be explained with reference to FIGS. 3–7. The apparatus 100 is comprised of foil 102, backing 104, and bubbles 110, 112, 114,116, 118, 120, 122, 124, 126, and 128. The bubbles 110–128 are attached to the backing 104. The bubbles may be clear plastic transparent containers. Bubbles 110, 112, 114, 116, 118, 120, 122, 124, 126, and 128 may include chambers 130, 132, 134, 136, 138, 140, 142, 144, 146, and 148 respectively, into which water portions 150, 152, 154, 156, 158, 160, 162, 164, 166, and 168 can be placed. The water portions 150–168 should be frozen if the apparatus 100 has just been taken out of a freezer.

The backing 104 includes backing portions 104a–f. There are holes in the backing 104 at the locations where the bubbles are as shown by the dashed circles in FIG. 7. There are holes in the backing 104 at the location of the dashed circles for bubbles 110, 112, 114, 116, 118, 120, 122, 124, 126, and 128 as shown in FIG. 7. FIG. 5 shows a cross section of the apparatus 100 along the line AB shown in FIG. 7. This cross sectional view shows the location of holes 105a–105e in the backing 104.

FIG. 6 shows a view of the apparatus 100 from the side 100a. From this side the backing 104 looks solid. The dashed lines CD, EF, GH, IJ, and KL are lines of perforations which allow each bubble of 110–128, with a certain portion of its adjacent backing of 104 and of the foil 102, to be separated from the other bubbles of 110–128. For example, bubble 110 can be separated from the other bubbles by tearing along perforation line CD and tearing along perforation line EF.

Figure 3:
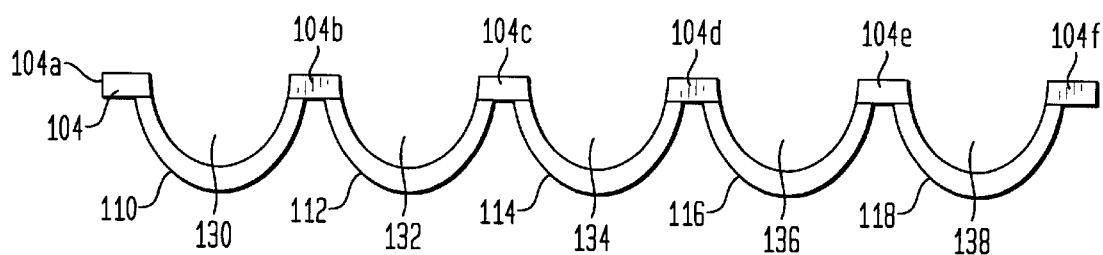
FIG. 3 shows a cross sectional view of a portion of an apparatus of an embodiment of the present invention without water and without foil.
Figure 4:
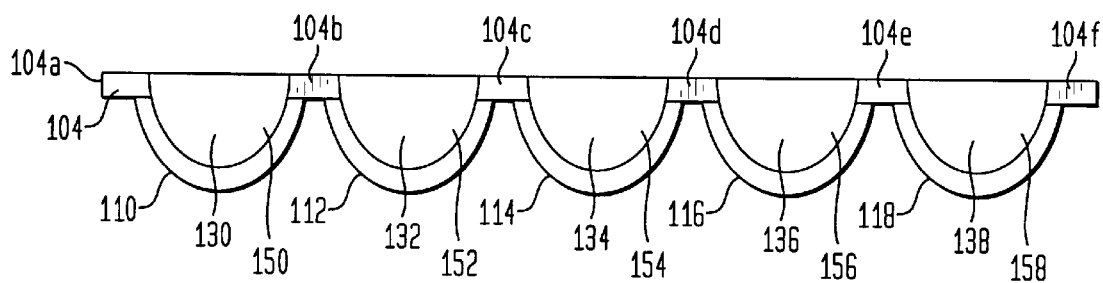
FIG. 4 shows a cross sectional view of a portion of an apparatus of an embodiment of the present invention with water but without foil.

FIG. 3 shows the apparatus 100 without water and without foil 102. FIG. 4 shows the apparatus 100 without foil 102.

The apparatus 100 is similar in structure to the ice tray 1 in U.S. Pat. No. 4,899,976 for Cederroth et al, however, the apparatus 100 shows curved bubbles 110–128 as opposed to the straight walls in Cederroth. The Cederroth patent is incorporated by reference herein. The ice tray 1 of Cederroth may be used to incorporate a method of an embodiment of the present invention.

In operation, the bubbles 110–128 are first fixed to the backing 104 as shown in FIG. 3. Water portions 150–168 are then placed in chambers 130–148, respectively, as shown in FIG. 4 is a liquid form. The water portions 150–168 should each be comprised of about ninety (90) percent distilled water and about ten (10) percent pure spring water. It is important to use a mixture of distilled water and pure spring water, and it is preferable to use the ninety percent, ten percent mixture mentioned. This is because pure spring water, alone, when frozen tends to char, crack, and generally does not freeze into a smooth clear ice cube. The ninety percent—ten percent mixture allows ice cubes to form which are smooth and clear.

After the water portions 150–168 are placed in their respective chambers the water portions 150–168 are subjected to a nitrogen flush. A nitrogen flush is used to filter bacteria particularly off of the surface of the water portions 150–168. A ozination process may then be performed prior to placing the foil 102 on. The ozination process reduces bacteria from the entirety of the water portions 150–168, while the nitrogen flush is directed at the surface of the water portions 150–168.

Next, foil 102 is placed over the openings in the backing 104, such as openings 105a–105e. The foil 102 is attached to the backing 104 so that the foil 102 provides a water tight seal for each of the chambers 130–148, all of which are now completely enclosed and completely sealed. Instead of ozination, as previously described, gamma radiation may be used to reduce bacteria in the entirety of the water portions 150–168. This can be done after the foil 102 is placed on and will also reduce bacteria on the packaging such as the foil 102. The apparatus 100 is then placed in a freezer. After a sufficient time to allow the water portions 150–168 to freeze, which may for example be six hours or less, the apparatus 100 can be removed from the freezer to get an ice cube. A user retrieves an ice cube by breaking the foil 102 at the location of the appropriate bubble. For example by breaking the foil 102 at the location for the bubble 110 shown in FIG. 7, the user can remove an ice cube formed in bubble 110. The removal of an ice cube from a bubble may be similar to the removal of an ice cube from a cavity in the Cederroth et al. U.S. Pat. No. 4,899,976 which is incorporated by reference herein.

Numerous modifications to and alternative embodiments of the present invention will be apparent to those skilled in the art in view of the foregoing description. Accordingly, this description is to be construed as illustrative only and is for the purpose of teaching those skilled in the art of the best mode of carrying out the invention. Details of the structure may be varied substantially without departing from the spirit of the invention and the exclusive use of all modifications which come within the scope of the appended claims is reserved.

I claim:

1. A method comprising the steps of:
   placing a first portion of a mixture of spring water and distilled water into a first chamber; and
   freezing the first portion of the mixture inside the first chamber to form a first ice cube.

2. The method of claim 1 wherein
   the mixture comprises about ninety percent distilled water and ten percent spring water.

3. The method of claim 1 further comprising
   placing a second portion of the mixture into a second chamber; and
   freezing the second portion of the mixture inside the second chamber to form a second ice cube.

4. The method of claim 3 wherein
   the first and second chambers are attached together by a backing.

5. The method of claim 1 further comprising
sealing the first chamber after placing the first portion of the mixture into the first chamber and before freezing the first portion.

6. The method of claim 1 further wherein
the first chamber is sealed by placing a foil over the first chamber.

7. The method of claim 1 further comprising
removing bacteria from the first portion after placing the first portion into the first chamber and before freezing the first portion.

8. The method of claim 1 further comprising
performing a nitrogen flush on the first portion after placing the first portion into the first chamber and before freezing the first portion.

9. The method of claim 1 further comprising
performing an ozination process on the first portion after placing the first portion into the first chamber and before freezing the first portion.

10. The method of claim 2 further comprising
placing a second portion of the mixture into a second chamber; and
freezing the second portion of the mixture inside the second chamber to form a second ice cube.

11. The method of claim 10 wherein
the first and second chambers are attached together by a backing.

12. The method of claim 2 further comprising
sealing the first chamber after placing the first portion of the mixture into the first chamber and before freezing the first portion.

13. The method of claim 2 further wherein
the first chamber is sealed by placing a foil over the first chamber.

14. The method of claim 2 further comprising
removing bacteria from the first portion after placing the first portion into the first chamber and before freezing the first portion.

15. The method of claim 2 further comprising
performing a nitrogen flush on the first portion after placing the first portion into the first chamber and before freezing the first portion.

16. The method of claim 2 further comprising
performing an ozination process on the first portion after placing the first portion into the first chamber and before freezing the first portion.

* * * * *